US005792727A

United States Patent [19]
Jacobs

[11] Patent Number: 5,792,727
[45] Date of Patent: Aug. 11, 1998

[54] LUBRICANT COMPOSITIONS

[76] Inventor: Norman Laurie Jacobs, P.O. Box 772235, Houston, Tex. 77215-2235

[21] Appl. No.: 601,782

[22] Filed: Feb. 15, 1996

Related U.S. Application Data

[63] Continuation-in-part of Ser. No. 955,909, filed as PCT/AU91/00208 May 15, 1991, abandoned.

[30]   Foreign Application Priority Data

May 16, 1990 [NL] Netherlands ............... 9001145

[51] Int. Cl.$^6$ ............................................. C10M 125/00
[52] U.S. Cl. ............... 508/113; 508/141; 508/143; 508/148; 508/161; 508/165; 507/140; 507/906
[58] Field of Search ..................... 508/113, 136, 508/141, 143, 148, 155, 161, 165; 507/140, 906

[56]            References Cited

U.S. PATENT DOCUMENTS

| | | |
|---|---|---|
| 1,532,922 | 5/1925 | Dodd . |
| 2,445,901 | 6/1948 | Ambrose . |
| 3,939,081 | 2/1976 | DeHart . |
| 4,063,603 | 12/1977 | Raybom ..................... 175/65 |
| 4,123,367 | 10/1978 | Dodd . |
| 4,128,486 | 12/1978 | Palmer et al. . |
| 4,145,297 | 3/1979 | Gatti et al. . |
| 4,183,236 | 1/1980 | Speigelberg et al. ........... 72/42 |
| 4,203,854 | 5/1980 | Silverstein . |
| 4,251,381 | 2/1981 | Lochner . |
| 4,434,063 | 2/1984 | Kageyama et al. . |
| 4,439,489 | 3/1984 | Johnson et al. . |
| 4,882,215 | 11/1989 | Ushio et al. ................. 428/143 |
| 4,927,549 | 5/1990 | Harsányi et al. . |
| 5,173,202 | 12/1992 | Kawabata et al. . |

FOREIGN PATENT DOCUMENTS

| | | |
|---|---|---|
| 1656883 | 1/1984 | Australia . |
| 2421084 | 8/1984 | Australia . |
| 4299985 | 11/1985 | Australia . |
| 101855 | 3/1984 | European Pat. Off. . |
| 2644796 | 9/1990 | France . |
| 1532922 | 5/1977 | United Kingdom . |
| 2018821 | 10/1979 | United Kingdom . |
| 2026024 | 1/1980 | United Kingdom . |
| 8505118 | 11/1985 | WIPO . |

OTHER PUBLICATIONS

Patent Abstracts of Japan C121, p. 76 JP.A. 57-80495 Date unknown.
Patent Abstracts of Japan C273, vol. 9, No. 74, JP.A.59-207943, Date unknown.
Patent Abstracts of Japan, vol. 9, No. 74 (C-273) (1797) Apr. 3, 1985.
Hawley Condensed Chemical Dictionary 11th Edition, N. Irving Sax, 1987, N.Y.

*Primary Examiner*—Sharon Gibson
*Assistant Examiner*—Cephia D. Toomer
*Attorney, Agent, or Firm*—Ostrolenk, Faber, Gerb & Soffen, LLP

[57]          ABSTRACT

Lubricant composition containing spherical particles of a ceramic material dispersed in a supporting vehicle. The composition is used as a lubricant, metalworking cooling fluid, drilling fluid or drilling mud.

20 Claims, No Drawings

LUBRICANT COMPOSITIONS

This is a continuation-in-part of application Ser. No. 955,909 filed as PCT/AU91/00208 May 15, 1991 and now abandoned.

This invention relates to lubricant compositions such as drilling muds and high pressure lubricants, which can be used with advantage for a variety of applications and especially for applications where extreme pressures and work loads are involved.

Lubricant compositions are materials that can be introduced between opposed solid surfaces, e.g. the surfaces of machine parts, in order to prevent these surfaces from contacting each other and to facilitate any relative motion between them as far as necessary. As a consequence, such lubricant compositions normally need to have hydrodynamic properties, i.e. the capacity of building up an internal pressure which is sufficient to balance the load on the opposed surfaces, and further friction-reducing and wear-reducing properties.

Many lubricant compositions have the form of oils and greases and can be used for a wide variety of applications. Lubricant oils may be based on petroleum derivatives, animal or vegetable oils or on synthetic materials such as polyalkylene glycols, dibasic esters, phosphate esters, silicones, silicate esters and the like. Lubricant greases are combinations of such oils with thickening agents such as e.g. metal soaps, modified clays, fine silicas and the like, and/or fillers such as e.g. asbestos, graphite, metal carbonates, hydroxides, oxides, phosphates, sulfides and the like. Moreover, lubricant oils and greases may contain special additives, e.g. to resist oxidation and corrosion and to improve such properties as adhesion, film strength and resistance to water wash out.

EP 3419 discloses a lubricating composition for use in the isothermal forging or sizing of metal workpieces in a hot die, which comprises a vitreous component which fuses at a temperature above 260° C. (500° F.), together with an inorganic abrasive component. It is intended that the vitreous material is a liquid at the forging temperatures used.

Other lubricant compositions have particulate solids as an essential ingredient and can be used in cases where the opposed surfaces are subjected to extreme pressures and work loads during use. Such particulate solid lubricants may consist of inorganic compounds having laminar crystal lattices such as crystalline graphite, molybdenum disulphide and the like, other soft inorganic compounds such as lead oxide, lime, talc, bentonite and the like, soft organic compounds such as soaps, waxes and fats, soft polymers such as poly(tetrafluoroethylene) or poly(chlorofluoroethylene) and the like, or malleable metals such as aluminium, copper, lead and the like, or fracturable metals such as zinc. All these solid lubricants have in common that they are plastic, elastic, malleable or fracturable and that they are generally soft in the particular sense of having rather low yield limits to their mechanical properties, or in any case, yield limits which are lower than the forces due to pressure or work load exerted upon them during use. The particulate solid lubricants may be used as such or as dispersions in oils, even water-based vehicles.

A drilling fluid containing glass beads is disclosed in CB 1 532 922. The beads have a particle size of from 44 to 88 μm and a hardness of 5.5 on the Moh's scale. Glass beads are generally unsuitable in the present compositions since they have a low compressive strength and tend to break up in use, leaving abrasive particles of glass. Furthermore the glass beads used in GB 1 532 922 have a softening point of about 730° C. and they are susceptible to attack by alkali.

The present invention now provides lubricant compositions, which are dispersions of solid particles in a supporting vehicle. Contrary to the teachings of the prior art, however, the solid particles in the invented compositions are substantially spherical particles of a hard, abrasion-resistant and fracture-resistant, thermally stable and chemically inert material. Quite surprisingly, compositions having such particles will have excellent lubricating properties under circumstances of high pressure and work loads, as well as other lubricating conditions, just because the yield limits of the mechanical properties of the particles are high enough to resist the forces exerted thereon during use.

An object of the invention is, therefore, to provide lubricant compositions which will be able to resist high forces due to pressure and work leads during use. Another object is to provide lubricant compositions that can be used in a variety of applications, including bearings and threaded connections irrespective of the existence of high pressures and work loads therein.

The solid particles used in the lubricant composition of the invention should be made of a hard, abrasion-resistant and fracture-resistant, thermally stable and chemically inert material, in order to withstand extreme pressure and work loads during use. Suitable particles are made primarily of ceramic materials, although some materials of other nature may also be appropriate, particularly silica-based materials. Examples include particles of silica-alumina ceramics, optionally including oxides of other materials (eg. selected from the group consisting of oxides of alkali metals, B and P), and fused silica.

The particles used in the compositions of the invention are substantially spherical and smooth in order to reduce friction and wear during use or to participate or contribute in other ways towards the lubricating function. The particles preferably have an average size of less than about 250 microns in diameter for practical purposes, preferably less than about 100 microns and most preferably between about 1 and about 60 microns, although particles outside this range may be used for some compositions.

It is preferred that the deviation from the average particle size in a given amount of material should be more than 10%, and more preferably at least 25%, so as to provide a closely-packed layer of separating and supporting material between opposed parts, irrespective of whether the particles occupy a small or large part (less than or more than 25%) of the volume of a composition.

The particles are hard, abrasion-resistant and fracture-resistant. They are not substantially distorted at high pressures, eg at 10,000 or even 25,000 psi and often over 40,000 eg up to 120,000 psi. The integrity of the particles is maintained in use, and particles effectively do not break up or chip leaving abrasive, broken material. The particles preferably have a hardness of at least 5.5, most preferably at least 6.5, on the Mohs scale and typically up to 8, and most suitably about 7.

Particles used in the invention are thermally stable, and will not be substantially distorted at the temperatures achieved in use. Particles which distort with either temperature or pressure are no longer spherical and will not roll and function efficiently as a lubricant.

Suitable particles preferably have a softening point of at least 750° C., preferably at least 850° C. or even at least 1000° C., and often up 1500° C. Particles are effectively chemically inert, and in practice will only react under extreme conditions with very strong reagents such as concentrated hydrochloric acid.

It is preferred that the particles have an average diameter of from about 1 to 60 μm, a specific gravity of from about 2 to 2.5 g/cm$^3$, a specific surface area of from about 1.4 to 1.6 m$^2$/cm$^3$, and a hardness of from about 6.5 to 8 on the Mohs scale.

Examples include particles of silica-alumina ceramics, optionally including oxides of other materials (eg. selected from the group consisting of oxides of alkali metals, B and P), and fused silica.

Especially suitable particles are those which are manufactured and sold by Zeelan Industries Inc. of St. Paul, 20 Minn., U.S.A., under the tradename Zeeospheres. These Zeeospheres are thick-walled hollow spheres of silica-alumina ceramics having a hardness of 7 on the Mohs scale, a softening point of about 1200° C. and a specific gravity (ASTM D-153) of between 2.4 and 2.0 g/cm$^3$. Their compressive strength is stated to be greater than 60,000 psi (i.e. greater than 4,200 kg/cm$^2$) but may in fact be substantially higher. The Zeeospheres are available in several types, differing in average particle size, specific gravity, and specific surface area. According to manufacturer's published data, some of these types can be specified as follows:

TABLE

| Zeeospheres type | 200 | 400 | 600 | 800 | 850 | X-60 |
| --- | --- | --- | --- | --- | --- | --- |
| Average particle size, microns | 4.9 | 6.9 | 9.9 | 27.1 | 55.9 | 2.9 |
| Specific gravity (g/cm$^3$) (ASTM D-153) | 2.3 | 2.2 | 2.1 | 2.0 | 2.0 | 2.3 |
| specific surface area (m$^2$/cm$^3$) | 1.52 | 1.24 | 1.03 | 0.62 | 0.18 | 2.31 |

While experiments with Zeeospheres of type 200 have given good results, other types may be used with the same or even greater advantage, depending on the lubricant composition in which they are used and on the application for which the composition is utilized.

The solid particles as defined above may be used in proportions of at least 0.1% by weight of the total lubricant composition. The upper limit will be determined by practical considerations, including the intended application of the composition, and by the nature of the supporting vehicle.

The solid particles are incorporated in a supporting vehicle which may be any petroleum-based, organic-based, silicone-based or even water-based vehicle. Preferred vehicles are those that have lubricating properties of their own, such as e.g. the well-known lubricant oils and greases.

The lubricant oils to be used as a supporting vehicle may be of any conventional type and may thus be based e.g. on petroleum derivatives, animal or vegetable oils, or on synthetic materials, such as polyalkylene glycols, esters of dibasic organic acids, phosphate esters, silicones, silicate esters and the like. The lubricant greases to be used as a supporting vehicle will normally be a combination of such oils with thickening agents, such as e.g. metal soaps (salts of alkaline or alkaline earth metals with monobasic or polybasic aliphatic acids, such as sodium, lithium, barium stearates, hydroxystearates, oxalates, sebacates and the like), modified clays, fine silicas and the like, and/or fillers or additives such as e.g. asbestos, graphite, metal carbonates, oxides, hydroxides, phosphates, sulphates, sulfides, and the like. Such thickening agents, fillers and additives are normally used in gelled form or in fine particulate form, as appropriate, and care should be taken that the fillers and additives are non-abrasive and will not be themselves or in combination with other substances, agglomerate to loose their fine particulate form.

In the case of using a lubricant oil or grease as a supporting vehicle, the aforesaid solid particles may preferably be used in a proportion of about 50 to 60% by weight, based on the total lubricant composition. That is, the composition may preferably comprise about 50 to 60% by weight of particles of a hard, abrasion-resistant and fracture-resistant, thermally stable and chemically inert material, and about 40 to 50% by weight of a lubricant oil of lubricant grease.

One or more further lubricant materials may be included in the composition of the invention. Examples of suitable further lubricant materials include molybdenum disulphide, other metal sulphides, graphite, talcum, mica, fatty acid esters, halogenated olefin polymers, metal oxides, hydroxides, carbonates, phosphates, sulphates, chlorides, bromides, iodides or combinations thereof, metal stearates, oxalates, sebacates, metal salts of monobasic or polybasic aromatic acids, malleable metals such as aluminium, copper and lead, or any other material compatible with and insoluble in the supporting vehicle. Such additional materials, in fine particulate form should be essentially nonabrasive and should not by themselves or in combination with water or other substances agglomerate to loose their fine particulate form, or functionality, as appropriate.

If such additional lubricant materials are used, they are preferably present in a proportion of not less than about 0.1% by weight of the total composition. A proportion of about 1 to 5% by weight will be sufficient for many purposes, and therefore is preferred. In that case, the total composition may comprise about 45 to 59% by weight of particles of a hard, abrasion-resistant and fracture-resistant, thermally stable and chemically inert material, about 1 to 5% by weight of particles of another lubricant material, and about 40 to 50% by weight of a supporting vehicle.

Further, conventional additives such as corrosion inhibitors and anti-oxidants, tackifiers and wetting agents, may be incorporated in the composition, normally as a component of the supporting vehicle, provided that they do not significantly affect the functionality of the main ingredients in an adverse fashion.

The lubricant compositions of the present invention can be used for a wide variety of applications, and especially for those cases where high pressures and work loads, and high temperatures are involved. The range of possible applications is not restricted to high work loads or high temperatures, however, and utilisation at moderate or even low work loads and moderate or low temperatures may be equally advantageous. Further, utilisation of the lubricant compositions can be made irrespective of any relative motion between the parts to which they are applied and this means that the lubricant compositions of the present invention will function equally well in cases of high relative speed and in cases of low relative speed between the lubricated parts where only a separating function is necessary. In consequence thereof, the lubricant compositions can be used for the lubrication of all machinery, including bearings, construction and mining equipment.

In the oil and gas production industry, special types of lubricant compositions are used for application between the male and female parts of threaded tubular connections. This is done to prevent such parts from seizing up or being welded to each other when they are screwed together and also, in many instances, to provide a fluid tight seal between them during use. Such lubricant compositions (often termed "thread compounds") should permit the threaded connections to be made up and broken out several times during the construction of oil and gas wells despite the high work loads exerted on them. Moreover, after make-up of the threaded connections, the lubricant compositions should be capable of providing a fluid tight seal between the threaded parts, even if an oil or gas, or drilling mud or other fluid material is flowing at high pressure through the tubing or pipe so connected. It has appeared that the lubricant compositions of the present invention are able to satisfy all these requirements. Further, in the oil and gas production industry, special types of lubricant compositions are normally used for lubrication of threaded connections in a drill string of a rotary drill, connections between drill pipes themselves (rotary shouldered connections or tool joints), connections between the bottom component of a drill pipe and a drill collar, connections between a drill collar and a drill bit, and connections between any other tool or apparatus screwed in place above or below any of these. Such lubricant compositions (e.g. so-called "tool joint compounds" and "drill collar compounds") should permit drill pipes and other apparatus to be screwed together with minimum tendency for continuing make-up while drilling, thereby providing for conveyance of energy (torque) from pipe section to pipe section down the length of the drill string and further to the other apparatus, during this operation. It has appeared that the lubricant compositions of the present invention are capable of satisfying such requirements and that they can be used for all these different applications, including strings of pipe connected to subsurface motors.

The lubricant compositions of the invention are capable of being used for applications where the term "lubricant" is not normally used but where a certain lubricating function is nevertheless always involved. Such applications are e.g. the use of said compositions as cooling fluids in metal working (such as e.g. cutting, pressing, drawing, honing, grinding and polishing) operations and the use of such compositions as drilling fluids or drilling muds in drilling operations, in which the supporting vehicle may be oil-based, but is preferably water-based. In the latter case, it is preferred to use the solid particles in a proportion of at least 5, preferably 5 to 10 parts by weight of the total composition. In other words, the drilling fluid or drilling mud will comprise at least 5, preferably 5 to 10 parts by weight of particles of a hard, abrasion-resistant and fracture-resistant, thermally stable and chemically inert material, and up to 95, preferably 90 to 95 parts by weight of a conventional water-based vehicle for a drilling fluid which may include heavy-weight fillers, thickening agents, wetting agents and the like.

The invention is further illustrated by the following examples.

EXAMPLE 1

| Ingredients: | Percentage by weight: |
|---|---|
| Zeeospheres, type 200 | 55 |
| Lithium grease (NLGI No. 2) | 42 |
| Molybdenum disulphide | 3 |
| | 100 |

In this composition, which is suitable for use in bearings, the lithium grease is a dispersion of 7.5% lithium 12-hydroxystearate in petroleum oil.

EXAMPLE 2

| Ingredients: | Percentage by weight: |
|---|---|
| Zeeospheres, type 200 | 57.0 |
| Crystalline graphite | 3.0 |
| Supporting vehicle | 40.0 |
| | 100.0 |

EXAMPLE 3

| Ingredients: | Percentage by weight: |
|---|---|
| Zeeospheres, type 200 | 57.0 |
| Molybdenum disulphide | 3.0 |
| Supporting vehicle | 40.0 |
| | 100.0 |

In the compositions of Examples 2 and 3, the supporting vehicle will normally be a grease (e.g. a dispersion of metal soap in oil) which includes a tackifier, a wetting agent, an anti-corrosion agent, and an antioxidant. The compositions are suitable for use in threaded connections.

EXAMPLE 4

| Ingredients: | Percentage by weight: |
|---|---|
| Zeeospheres, type 200 | 57.0 |
| Molybdenum disulphide | 3.0 |
| Supporting vehicle | 40.0 |
| | 100.0 |

In this composition, the supporting vehicle will have the same meaning as in Examples 2 or 3.

EXAMPLE 5

Lubrication of Bearings

Lubricant compositions comprising 10%, 20%, 30%, 40%, 50%, 55%, 57% and 60% by weight respectively of spheres type 200 in the lithium grease used in Example 1 (NLGI No. 2) were tested on Timken tapered roller bearings in a Sun Oil Company bearing tester. The bearings were rotated at high speed and at temperatures deliberately intended to cause the decomposition of the petroleum-based supporting grease.

Each test ended when the bearings seized up due to thermal decomposition of the grease. The time period until seizure was measured and showed a gradual increase for the range of compositions, starting with a Zeeospheres content of 10% and ending with a Zeeospheres content of 55%. The time period for compositions having 57% and 60% Zeeospheres content was equal to that of the composition having 55% Zeeospheres content. Inspection of the bearings afterwards showed in all cases that no wear had taken place in the tests where compositions of 40% and more Zeeospheres content had been used.

Another test was made with a lubricant composition comprising 35% by weight of Zeeospheres type X-60 and 65% by weight of lithium grease (NLGI No. 2). The result was about the same as that of the test with a composition having 55% Zeeospheres type 200 content.

A further test was made with a lubricant composition comprising 30% by weight of Zeeospheres type 200, 3% by weight of molybdenum disulphide and 67% by weight of lithium grease (NLGI No. 2). The result was about the same as that of the test with a composition comprising 50% by weight of Zeeospheres type 200 and 50% by weight of lithium grease (without molybdenum disulphide).

Additional tests with compositions similar to the last-mentioned composition but wherein the molybdenum disulphide had been substituted by an equal amount of zinc oxide, zinc orthophosphate, calcium borate, and graphite respectively, gave similar results.

EXAMPLE 6

Lubrication and Sealing of Threaded Connections

A lubricant composition comprising 57.0% by weight of Zeeospheres 200, 3.0% by weight of molybdenum disulphide and 40.0% by weight of a supporting vehicle (a lithium grease together with a tackifier and a wetting agent and equivalent to the specifications of an NLGI No. 1 grease) was used to lubricate and seal threaded connections of two test specimens, each consisting of two tubes ("pin by pin pup joints") joined by an Atlas Bradford TC coupling. The coupling was of 2 and ⅞ inch outer diameter and N-80 type steel and further had metal to metal seals. The threaded connections were made up and broken out several times and the make-up and break-out torques applied on each occasion were graphically recorded versus time and turns. It appeared from the graphs that the make-up torques for successive make-ups were nearly identical, which indicated that the lubricant composition as used performed effectively and that the process of making up and breaking out did not damage the threads and shoulders and seals. This was confirmed by visual inspection.

One made-up test specimen was tested for sealing properties by filling it with nitrogen gas at high pressure and immersing the article in a water bath. After a test period of 15.5 hours at an internal pressure of 12,000 psi (840 kg/cm$^2$), the connection was found to be leak-free. Thus, the lubricant composition as used had no negative effect with respect to sealing on the connection with metal to metal seals.

EXAMPLE 7

In another test, a lubricant composition similar to that in Example 6 was used to lubricate and seal the threaded connections of a test specimen consisting of two tubes of 2 and ⅞ inch outer diameter and N-80 type steel interconnected at their ends by a coupling. The threads of the threaded connections were non-sealing and had a leak path between male and female parts when made up. The connections were made up and broken out ten times. Upon inspection, no damage to the threads could be observed. Sealing properties were found by immersing the test specimen in a water bath for 30 seconds at an internal nitrogen gas pressure of 10,000 psi (700 kg/cm$^2$).

EXAMPLE 8

Lubrication and Sealing of Rotary Shouldered Connections

A lubricant composition of the same type as in Example 6 was used to lubricate and seal the threaded connections of a test specimen consisting of two sections of 5.5 inch drill pipe interconnected by a rotary shouldered connection with API threads. The connections were made up to a recommended torque and broken out several times without damage to thread, shoulders or others parts.

In another experiment, the same connections were made up several times to an excess of 25% of the recommended torque. Again, no damage was observed.

EXAMPLE 9

Utilization in Drilling Muds

A conventional drilling mud comprising 88% by weight of water and 12% by weight of a combination of Wyoming bentonite with thickening agent and wetting agent together with alkali, which is normally satisfactory for drilling oil and gas wells in southern Texas and Louisiana to depths of about 1500 meters, was modified by the addition of Zeeospheres type 200.

In a first experiment, five parts of Zeeospheres were added to 100 parts of drilling mud and the resulting composition was used in a drilling test on carbonaceous rocks. A small increase in drilling depth was experienced.

In a second experiment, ten parts of Zeeospheres were added to 100 parts of drilling mud and it appeared that the increase in drilling depth was considerable.

In both cases, torque on the drill pipe was maintained at substantially the same level and it appeared that the rotational speed was increased. Further, the Zeeospheres were well suspended in the fluid.

EXAMPLE 10

A composition similar to that illustrated in example 6 was used as a lubricant for a sleeve bearing required to sustain about 40 tons of work load in certain construction equipment. The lubricant performance was satisfactory. Upon dismantling, no wear was observed in the sleeve.

EXAMPLE 11

A composition comprising 57% by weight of Zeeospheres type 200, 5% by weight of zinc phosphate and 38% of 30 aluminium complex grease (equivalent to an NLGI No. 2 grease) was used as a lubricant for furnace door hinges. The composition functioned satisfactorily, thus enabling normal operation of the doors after an extended period of time.

COMPARATIVE EXAMPLE

Two sets of microspheres were subjected to a number of assessments to determine their suitability for use in lubricant compositions. Zeeospheres (Zeelan Industries), Type 600 and typical glass beads (3M Company) were compared.

The glass beads used had an average particle diameter of about 50 microns and a fairly narrow size distribution. Zeeospheres type 600 have an average particle size of about 10 µm, but a broader particle size distribution, with some particles up to 44 µm in diameter.

The microspheres were subjected to pressure and then examined under Scanning Electron Microscope (SEM) to obtain a measure of the compressive limits of the microspheres. Since the particle size distribution of the Zeeospheres is broader, the load exerted on individual particles will be greater.

Typical areas of each type of microsphere were prepared by placing a very thin layer of the microspheres on a polished 5/16" diameter metal stub. These flat surfaces were machined and polished from standard hardened tool steel drill bit stock. The layers of microspheres were obtained by coating the flat stub with a very thin layer of silver paste obtained by diluting normal silver paste with methylene chloride. The thin layer of silver paste was then pressed into the microspheres to form a very thin layer of spheres for testing. The 5/16" diameter stub was placed in a Parr manual press in contact with another identical stub and pressure was applied. The pressure was applied very slowly initially before the final maximum pressure. The force applied to the 5/16" diameter stub was 640#. The outer 1/32" of the stub was not affected by this force and hence the total pressure applied was approximately 13,000 psi. Based on observations from scanning electron microscopic examination of these surfaces after this applied pressure, it appears that the actual contact area is about ½ to ⅕ of the total area of the stub. This is, of course, dependent on the surface finish of the metal and the intimate contact of the microspheres. Based on this, the pressure applied to the microspheres is calculated as between 25,000 psi and 75,000 psi.

Other properties of the microspheres were assessed, including softening point, surface energy, structure and inertness.

Results

|  | Glass Beads | Zeeospheres |
| --- | --- | --- |
| Compressive Strength (p.s.i) | 30,000 | 60,000–100,000 |
| Softening Point (Degrees C.) | 589–704 | 1200 |
| Surface Energy | low | High |
| Structure | Amorphous | Crystalline |
| Inertness | Attacked by alkalis | inert to acids and alkalis |
| Hardness | 5.5 | 7 |

Glass beads will distort at lower temperatures than Zeeospheres, and will fracture at lower pressures, leaving abrasive particles of glass. The low surface energy of glass beads gives a lower resistance to break, and the amorphous structure of glass also contributes to its lower compressive strength.

Zeeospheres are inert to acids and alkalis, whereas glass beads are attacked and etched by alkalis, leaving rough, abrasive particles.

I claim:

1. A lubricant composition comprising at least 0.1% by weight of substantially spherical particles of a hard, abrasion-resistant and fracture resistant, thermally stable and chemically inert material wherein the particles are silica-based ceramic particles and have a Mohs hardness of at least 5.5, a softening point of at least 750° C. and an average size of less than about 250 µm and are not distorted under a pressure of 700 kg/cm$^2$ (10000 psi), dispersed in a supporting lubricant vehicle selected from the group consisting of organic-based, silicone based or water-based vehicles.

2. A lubricant composition as claimed in claim 1, wherein the particles are of silica-alumina ceramics.

3. A lubricant composition as claimed in claim 1, wherein the spherical particles have an average diameter of less than 100 µm.

4. A lubricant composition as claimed in claim 1, wherein the particles are hollow spheres.

5. A lubricant composition as claimed in claim 1, wherein the particles have an average particle diameter of from about 1 to 60 microns, a specific gravity of from about 2 to 2.5 g/cm$^3$, a specific surface area of from about 1.4 to 1.6 m$^2$/cm$^3$, and a Mohs hardness of at least about 6.5.

6. A lubricant composition as claimed in claim 1, wherein said supporting vehicle is a lubricant oil or lubricant grease.

7. A lubricant composition as claimed in claim 1, comprising from about 50 to 60% by weight of the spherical particles and from about 40 to 50% by weight of a lubricant oil or lubricant grease.

8. A lubricant composition as claimed in claim 1, further comprising at least 0.1% by weight of particles of at least one further lubricant material.

9. A lubricant composition as claimed in claim 8, wherein the further lubricant material is chosen from molybdenum disulphide, graphite, talcum, mica and fatty acid esters.

10. A lubricant composition as claimed in claim 9, comprising from about 45 to 59% by weight of the spherical particles, from about 1 to 5% by weight of particles of at least one further lubricant material, and from about 40 to 50% by weight of a supporting vehicle.

11. A lubricant composition as claimed in claim 1, wherein the supporting vehicle is a water-based or an oil-based vehicle.

12. A lubricant composition as claimed in claim 11 adapted for use as a drilling fluid or drilling mud, and comprising at least 5 parts by weight of the spherical particles and up to 95 parts by weight of a water-based supporting vehicle for a drilling fluid or mud.

13. A lubricant composition as claimed in claim 1, wherein the supporting vehicle comprises a metal working operation cooling fluid or a drilling fluid or drilling mud.

14. A lubricant composition as claimed in claim 1, wherein the spherical particles are not distorted under a pressure of 1,750 kg/cm$^2$ (25,000 psi).

15. A lubricant composition as claimed in claim 1, wherein the particles are hollow silica-alumina ceramic spheres having an average particle diameter of from about 1 to 60 microns, a specific gravity of from about 2 to 2.5 g/cm$^3$, a specific surface area of from about 1.4 to 1.6 m$^2$/cm$^3$ and Mohs hardness of from about 6.5 to 8.

16. A method of lubricating machinery selected from the group consisting of bearings, threaded connections, rotary-soldered connections and construction and mining equipment utilizing a lubricant composition as claimed in claim 1.

17. A lubricant composition as claimed in claim 5, wherein the spherical particles have a Mohs hardness of from about 6.5 to 8, a softening point of at least 850° C. and are not distorted under a pressure of 1750 Kg/cm$^2$ (25,000 psi).

18. A method of lubricating machinery selected from the group consisting of bearings, threaded connections, rotary-soldered connections and construction and mining equipment utilizing a lubricant composition as claimed in claim 17.

19. A lubricant composition as claimed in claim 1, wherein the spherical particles are fused silica.

20. A lubricant composition as claimed in claim 1, in which the particles have an average size of from 1 to less than about 250 µm.

* * * * *